Dec. 5, 1933.    E. S. DONOVAN    1,937,876
RADIO BEACON
Filed May 2, 1928    5 Sheets-Sheet 1

INVENTOR.
Eugene S. Donovan.
BY C. R. Halbert.
E. L. Davis.
ATTORNEYS.

Dec. 5, 1933.  E. S. DONOVAN  1,937,876
RADIO BEACON
Filed May 2, 1928  5 Sheets-Sheet 3

INVENTOR.
Eugene S. Donovan.
BY C. R. Halbert.
E. L. Davis.
ATTORNEYS.

Dec. 5, 1933.  E. S. DONOVAN  1,937,876
RADIO BEACON
Filed May 2, 1928   5 Sheets-Sheet 4

INVENTOR.
Eugene S. Donovan.
BY C. R. Halbert.
E. L. Davis.
ATTORNEYS.

Dec. 5, 1933.  E. S. DONOVAN  1,937,876
RADIO BEACON
Filed May 2, 1928  5 Sheets-Sheet 5

INVENTOR.
Eugene S. Donovan,
BY  C. R. Halbert,
     E. L. Davis.
        ATTORNEYS.

Patented Dec. 5, 1933

1,937,876

UNITED STATES PATENT OFFICE

1,937,876

RADIO BEACON

Eugene S. Donovan, Dearborn, Mich., assignor to Ford Motor Company, Highland Park, Mich., a corporation of Delaware Application May 2, 1928. Serial No. 274,397

11 Claims. (Cl. 250—11)

The object of my invention is to provide a radio beacon of simple, durable, and inexpensive construction.

Still a further object of my invention is to provide a radio beacon which is especially adapted for use in connection with the piloting of airplanes or other aircraft.

Still a further object of my invention is to provide a radio beacon which will send out a signal in a predetermined direction so that a pilot may fly on that signal and may be kept upon his course by following the signal.

Still a further object of my invention is to provide means for sending a guiding signal for an aircraft pilot in as narrow a path as possible in order to keep the pilot upon his course.

Still a further object of my invention is to provide a radio beacon with a sending set which will send out a certain signal of maximum intensity in one direction and another signal of maximum intensity in another direction which however is spaced but a short distance from the plane of maximum intensity of the other signal, whereby the pilot may know that he is on his course when he can hear both signals distinctly and may know that he is off his course when he can hear one signal more distinctly than the other.

Still a further object of my invention is to send out a Morse code "N" signal on a directed beam and to send out a Morse code "A" signal on another directed beam at a slight angle to the first beam whereby a pilot traveling on a line between the directed beams receives a Morse code "T" signal whereas he will receive an "A" or an "N" signal after he gets off a line between the two directed beams.

Still a further object of my invention is to provide a radio beacon which will indicate to the pilot of an aircraft the direction toward or from the radio beacon, and which will also indicate to the pilot when he has actually reached a position directly above the station, so that he will not fly by the station when visibility is low, and which may be combined with other means for indicating distances from the airport.

Still a further object of my invention is to provide a radio beacon having sending loops disposed at right angles to each other and which are provided with means for balancing the loops with each other and for balancing the two ends of each loop.

Still a further object of my invention is to provide a radio beacon which may be converted temporarily into a regular sending station whereby an individual message may be transmitted to an aircraft pilot by means of the radio beacon without materially affecting the operation thereof and by only suspending its operation as a beacon just long enough to send such message.

Still a further object of my invention is to provide means for controlling the operation of a radio beacon from a remote point whereby the operating mechanism and the parts for the beacon may be disposed in position adjacent to the sending loops but the direction of the signal beams and the starting or stopping of the sending may be controlled from the hangar offices of an airport and the operation of the beacon may be indicated to the operator in such offices.

Still a further object of my invention is to provide a station indicator signal wherein the signal therefrom will be localized as much as possible to the air directly over the airport.

Still a further object of my invention is to provide a device for sending out a Morse "A" signal in one direction and the Morse "N" signal in a direction at an angle thereto, wherein the primary sending circuit may be operated to give a signal of a length equivalent to the combined length of the "A" and the "N" signal, and the secondary circuit may be switched to send the "A" signal in one direction and the "N" in another direction whereby the circuit breaker in the secondary circuit which changes the secondary current from the "A" to the "N" loop may draw an arc whereby the "T" signal may be substantially continuous when the pilot is upon his course and there will be no click of the pilot's receivers due to the change from the "A" to the "N" sending loops.

Still a further object of my invention is to provide means for sending an "A" signal from one sending loop and the "N" signal from another sending loop which when combined will form a continuous or "T" signal wherein the sets are provided with one cam operated breaker which closes the primary for a period of time equal to the length of the "T" signal and the secondary is normally connected into the "N" sending loop; and a second synchronized cam operated breaker is used for switching the current in the secondary to the "A" sending loop whereby the secondary breaker device may draw an arc and make a substantially continuous "T" signal and the cams and breakers need not be accurate enough to make them expensive.

Still a further object of my invention is to provide a synchronized set of cams in connection with a radio beacon, whereby certain of the cams may operate a directional beacon at intervals and the other cam may operate a local station indicator sending set between the intervals of the beacon whereby my improved radio beacon may both indicate to the pilot his direction from the station and the fact that he is or is not over the airport, and whereby synchronized position indicating sets may be located at intervals along the pilot's course.

Still a further object of my invention is to provide a remote control system for a radio beacon wherein the operator may send out the signal in any predetermined direction and the switchboard at the remote control station will indicate the direction in which the signal is being sent and also whether any signal is being sent.

Still a further object of my invention is to provide means at a remote control station for suspending the beacon signal to permit sending a special message to the pilot from the remote control station over the beacon sending set.

With these and other objects in view, my invention consists in the arrangement, construction, and combination of the various parts of my improved device as described in the specification, claimed in the claims, and illustrated in the accompanying drawings, in which:

The general plan of this radio beacon is to provide two balanced loop aerials which may be used for sending and which extend at right angles to each other. Each of these sending loops are connected to the secondary of a coil operated by the sending set, these coils being disposed with their median planes perpendicular to each other. Mounted within these secondary coils are a pair of primary coils which are disposed with their median planes at a relatively small angle relative to each other, namely an angle of forty-five degrees. Due to the arrangement of the coils and the balancing of the loop aerials, energizing of these primary coils will send out a beacon signal having its plane of greatest intensity midway between the median planes of the primary coils.

Figure 6:
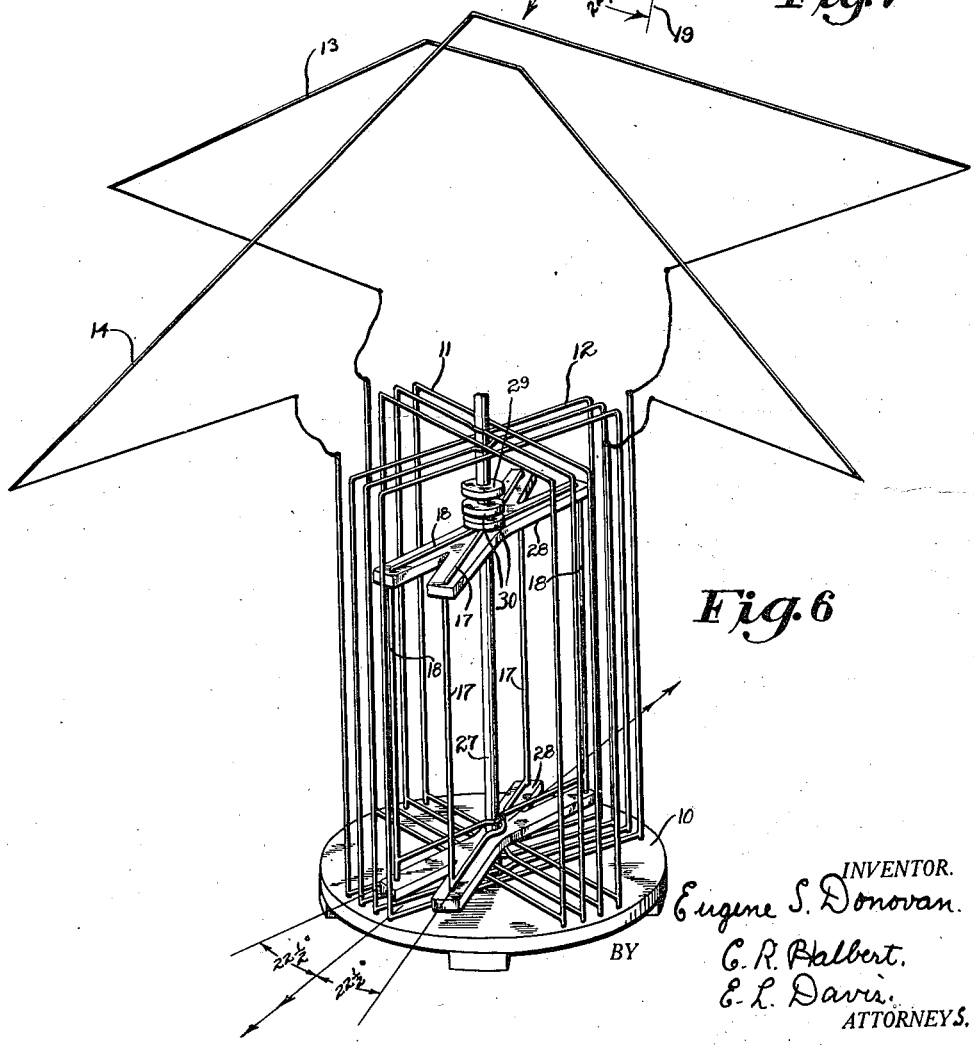
Figure 6 shows a diagrammatic schematic view of the sending coils and the aerial loops used in sending out my improved beacon signals.
Figure 8:
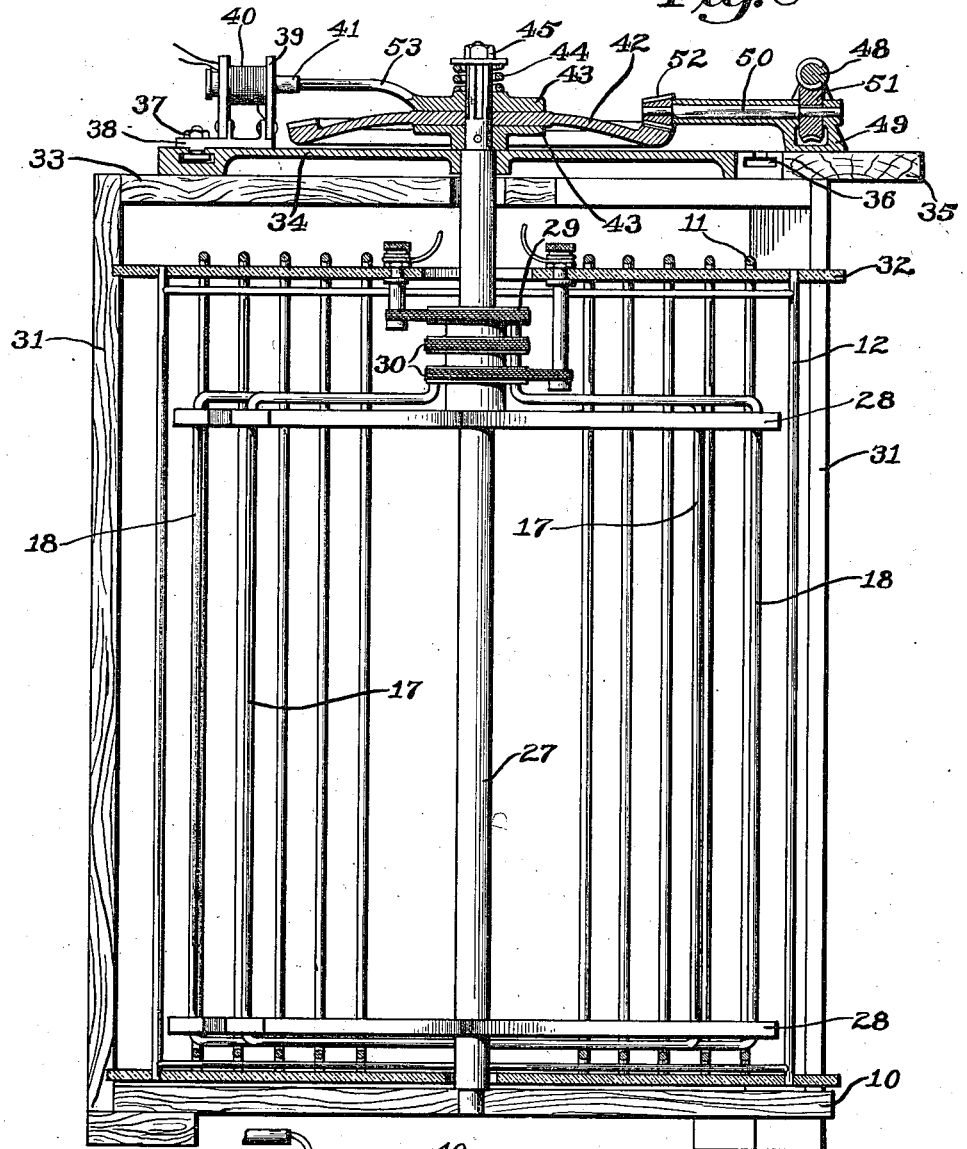
Figure 8 shows a vertical central sectional view through my improved beam signal sending device.
Figure 9:
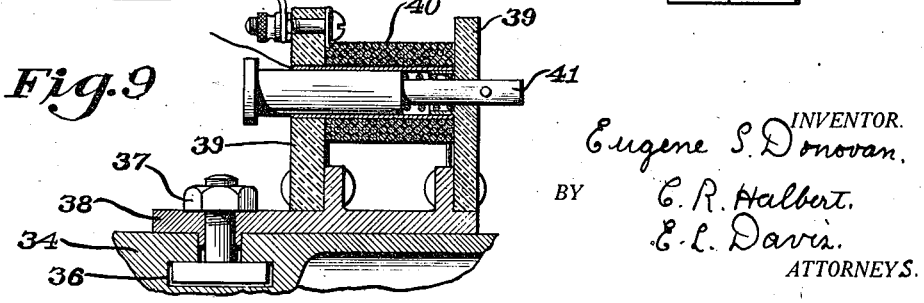
Figure 9 shows an enlarged vertical central longitudinal sectional view through the solenoid which controls the beacon direction.

In Figure 6, I have illustrated somewhat diagrammatically the form of device which is used in connection with my improved radio beacon, and which is constructed in accordance with the principles just described. In this device, a base 10 has the pair of secondary coils 11 and 12 fixed thereon with their median planes disposed at right angles to each other. Each of these secondary coils are connected with a loop sending aerial as is illustrated at 13 and 14. These coils 11 and 12 are connected through variable condensers 15 with the loops 13 and 14 whereby the loops may be exactly balanced with each other.

The centers of these loops are grounded out at 16. The condensers and the ground connections of Figure 6 have been omitted for the sake of clearness but they are diagrammatically illustrated in Figure 1. When these parts are put together the loops are balanced with each other and each end of each loop is balanced with the opposite end thereof by first setting one of the loops for its maximum signal and then balancing the ends of said loop being sure that the maximum signal efficiency thereof is retained. The other loop is then tuned so that its total capacity balances the total capacity of the first loop tuned and the signal efficiency thereof will be the same. The ends of the second loop are then balanced. The method of balancing capacities in sending loops is one which is known to those familiar with the radio art and forms no part of my invention so it will not be here further explained.

Mounted within the stationary secondary coils 10 and 11 are two primary coils 17 and 18 which are rotatably mounted within the coils 11 and 12 but are fixed at a forty-five degree angle relative to each other and fixed from rotation relative to each other. Due to the construction and arrangement of the parts, the energizing of the coils 17 will cause a radio signal to be sent out from the loops 13 and 14 which will have maximum signal intensity on a line approximately parallel with the plane of the coil 17. This is assuming that the stationary coils 11 and 12 are placed with their median planes coinciding with the planes of the loops 13 and 14. If these planes do not coincide, the direction of the maximum signal sent from the 13 and 14 will vary from the plane of the coil 17 by the same angle that median planes of the coils 11 and 12 vary from the planes of the loops 13 and 14.

If the primary coil 18 is similarly energized it will be seen that a signal of maximum intensity will be sent out from the loops 13 and 14 in the plane of the coil 18. Of course I am again assuming that median planes of the coils 11 and 12 coincide with the planes of the loops 13 and 14, or the direction of the maximum signal intensity would correspondingly vary.

Figure 2:
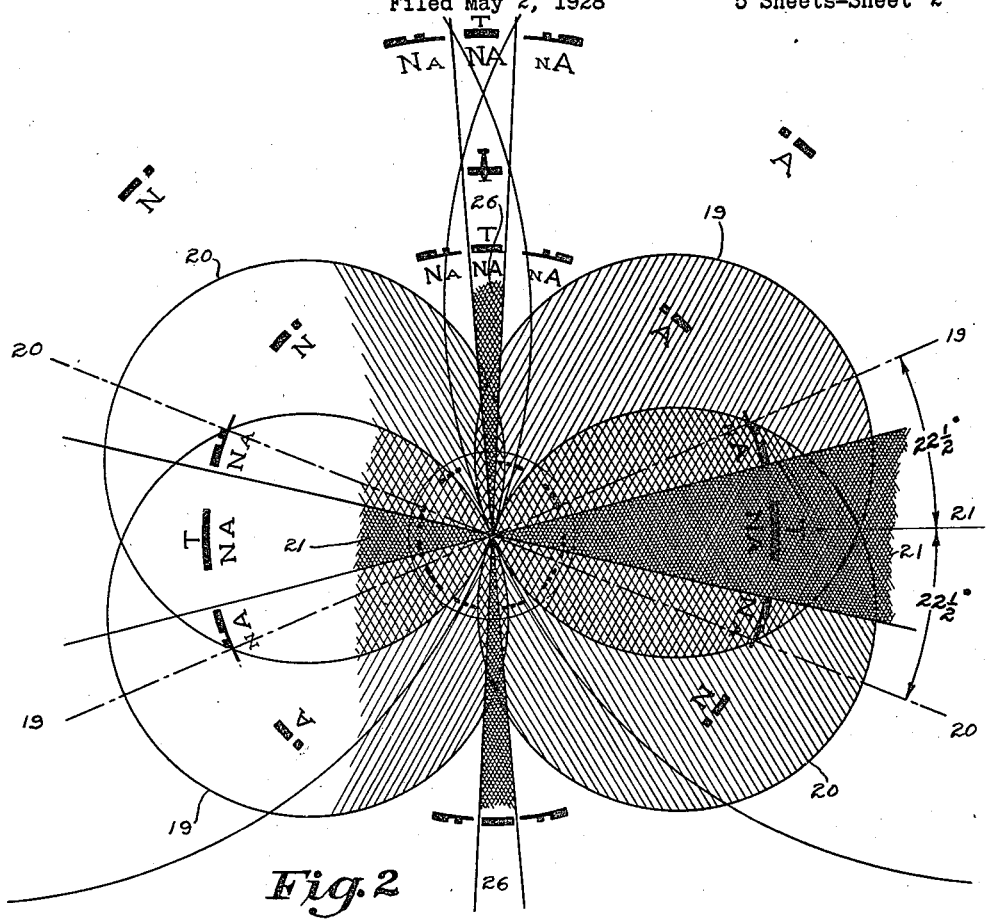
Figure 2 shows a schematic view of the signal which is sent out by my improved radio beacon.
Figure 7:
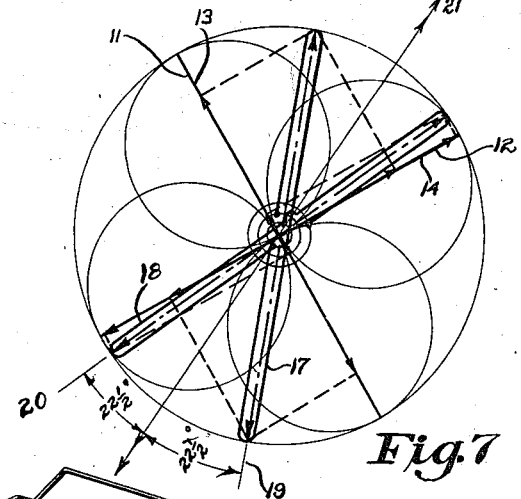
Figure 7 is a diagrammatic view illustrating the manner in which the signal shown in Figures 2 and 3 are sent out by means of the coils shown in Figures 6 and 7.

Referring to the diagram in Figure 7, let it be assumed that the line 11 and 13 and line 12 and 14 which represent respectively the secondary coil 11 and loop 13 and secondary coil 12 and loop 14 respectively. The primary coils are represented by the lines 17 and 18 respectively. If the primary coil 17 is energized a signal will be sent out from the loops 13 and 14 having its maximum intensity in a plane lying in the line 19. This maximum signal intensity is represented in Figure 2 by the circles 19, these circles having a dotted line extending therethrough to which I have also given the reference numeral 19 in order to avoid confustion. It will be understood that there is no actual line or plane of maximum signal intensity but that there will be a general region in the location of the line 19 which will have a maximum signal intensity and that this will taper off to a minimum signal intensity at either side thereof. If the coil 18 be energized, then it will cause the loops 13 and 14 to give out a signal having a plane of maximum intensity along the line 20 as appears in Figure 7 and in the area indicated by the circle 20 of Figure 2 with a maximum intensity at approximately the region of the dotted line 20 in the same figure.

There will be an area midway between the line 19 and 20 in both Figures 2 and 7 where the signals given out by the action of the loops 17 and 18 will have a tendency to overlap and will be relatively powerful. I have given the reference numeral 21 to the line indicating the center plane of this area in Figure 7 and also to the similar line in Figure 2. This general area has been further indicated by the cross hatching to which I have also given the reference numeral 21 in Figure 2.

Figure 3:
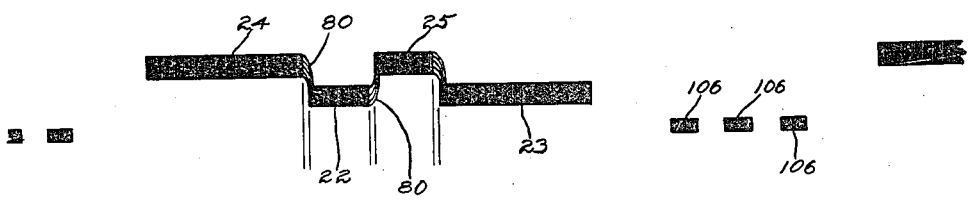
Figure 3 is a diagrammatic illustration of the message or signal which is received by the pilot of the aircraft.

Referring to Figure 3, it will be seen that if I send out a Morse code signal "A" represented by a dot 22 and the dash 23 and a Morse signal "N" represented by the dash 24 and the 25 alternately, sending first the "N" signal and then the "A" signal on the loops 18 and 17 respectively. It will be seen that the "A" signal will travel out from the station in opposite directions in the manner illustrated by the circles 19 in Figure 2. These signals will have a maximum intensity along the line 19. At the same time the "N" signal will travel out from the station along the area represented by the circles 20 and will have its maximum intensity along the line 20. Between these lines 19 and 20 will be the area 21 approximately along the line 21 which will have both signals therein at a relatively great intensity but alternating with each other so that they will form one long dash or a Morse code "T" signal in this area 21 as is illustrated by the dots and dashes 22 to 25 respectively in Figure 3. In other words if a pilot is traveling out from the station or traveling toward the station along the area indicated by the numeral 21, then he will get a Morse code "T" signal on his radio receiving set whereas he will get an "A" or an "N" code signal if he varies substantially to one side or the other of the area 21. The pilot can therefore tell when he is approaching the station on the "T" signal or leaving the station by weaving back and forth till he finds where the "T" signal is the strongest and where the "A" or "N" signal commences to become distinct. He then sets his course so he remains in the "T" signal and maintains same in that direction.

It is the plan to have similar radio beacons operating both at the starting and landing airport so that by operating the beacons at each station in a proper direction, then the pilot can always leave one station by the beacon from that station and enter the next station by the beacon of the said next station.

Due to the fact that the coils 17 and 18 are set in this form of device illustrated at approximately an angle of forty-five degrees it will be seen that the area of maximum "T" signal intensity therebetween will be relatively large when considering the portion between the shortest distance between the two coils. If however, the maximum "T" signal intensity be taken on a line at right angles thereto as is illustrated by the area 26 in Figure 2, it will be seen that this area is relatively very narrow. In fact in my practical experience I have been enabled to reduce this down so that it is approximately only six miles wide at a distance of two hundred miles from the station. On relatively longer distances therefore it is most satisfactory to use this narrow "T" area 26 as distinguished from the larger "T" area 21 as the variation of the pilot on his course can be largely lessened thereby.

It will be seen that the direction of the signals emanating from my improved beacon can be directed by the position of the coils 17 and 18 relative to the coils 11 and 12. This is accomplished by mounting these coils on the rotatable shaft 27 which has the arms 28 extending therefrom at the top and bottom thereof which carry the coils 17 and 18. These coils are connected with a common negative ring 29 and the spaced positive rings 30, which are designed to co-act with suitable brushes (not shown) whereby the radio energy may be conveyed to these coils 17 and 18 to energize same.

The base 10 has a plurality of uprights 31 connected thereto which support the top support 32 for the coils 10 and 11. These uprights 31 are not illustrated in Figure 6 as that figure is mostly diagrammatic and the showing of these uprights would interfere with the clearness thereof. Horizontal braces 33 extend across the top of the uprights 31 and are designed to support a disc 34 and a motor 46. This disc 34 forms a journal for the upper end of the shaft 27 and also T section groove 36 near the periphery thereof and in the upper surface thereof. A plurality of adjustable stops are designed to be mounted in this groove 36 and be clamped in place in any desired place therein by the T head bolts 37. These adjustable stops comprise a bracket 38 having spaced upwardly extending arms or ears 39 between which a solenoid 40 is mounted. A plunger 41 is mounted for reciprocation in the bracket 38 and the solenoid 40 and is designed to be moved in by the solenoid 40 when the latter is energized by an electric current. When the solenoid 40 is not energized the plunger 41 is designed to move to its retracted position. A plurality of these stops may be used in connection with the disc 34 and in fact it is intended to have one of these for each of the air routes to which aircraft is ordinarily sent.

A gear wheel 42 is designed to be mounted on the upper end of the shaft 27 by means of friction discs 43 which are pressed against the gear wheel 42 by a spring 44 and a nut 45. A motor 46 has a shaft 47 and the worm 48 mounted thereon. A gearing base is secured to the motor base 35 and supports a shaft 50 which has a worm wheel 51 at one end thereof in position to mesh with the worm 48 and the gear wheel 52 at the other end thereof designed to mesh with the gear 42.

From the construction of the foregoing parts it will be seen that if one of the solenoids 40 be energized to extend the stop or plunger 41 into the path of the arm 53 which extends from the upper friction disc 43 and then the motor 46 is energized to rotate the gears 52 and 42, then that the gear 42 will rotate until the arm 53 comes in contact with the extended stop 41 at which time the gear 42 will stop. This stoppage is permitted by the friction connection between the gear 42 and the shaft 27. It will thus be seen that the position of the coils 17 and 18 relative to the coils 11 and 12 may be moved to any predetermined position by placing the various stops and then extending the desired stops by means of the solenoid 40 and then rotating the motor 46 to bring the shaft 27 to a desired position which would of course bring the coils 17 and 18 to such position. Clearance is allowed between the arm 53 and the gear 52 so that the arm 53 will clear the gear 52 when the gear 42 is being rotated.

Means are provided for controlling the position of the coils 17 and 18 at a distance therefrom comprising the switch 54 which is selectively rotatable into contact with a plurality of contact points 55. One of these switch points 55 is merely a blank to indicate when the switch 54 is disconnected, and the remaining points are adapted to each be connected with one of the solenoids 40. By this construction the station selector switch 54 can be rotated to select any one of a plurality of the solenoids 40 whereby the corresponding plunger 41 may be advanced into the path of the arm 53. Lights 56 are provided in connection with each of the switch points 55 so that when the arm 53 has been rotated by the motor 46 into contact with the extended plunger 41, then the station indicator light 56 will be lit as long as the arm 53 is in contact with the plunger 41. A switch 57 is provided which is designed when closed to close the current in the station selector motor 46 so that when the switch 54 has been moved into contact with one of the live contacts 55, then the appropriate plunger 41 will be extended, and then the switch 57 may be closed to operate the motor 46 and consequently rotate the gear 42 which in turn swings the arm 53, which will swing this arm into contact with the extended plunger 41. When it reaches this position, the appropriate light 56 will light, and the gear 42 will slide around on the shaft 27 due to its frictional engagement therewith. Of course as soon as this light 56 lights the switch 57 may then be opened to shut off the motor 46 and consequently stop the rotation of the gear 42.

From the construction just described it will be seen that I can put the switch 57 and the switch 54 as far away from the beacon sending set as may be necessary, which in most cases will be a distance approximately from one corner of the airport landing field over to the airport dispatcher's office and the control for these sending coils and the direction thereof may be entirely controlled from the dispatcher's office with the consequent obvious convenience. As has been noted the station toward which the beacon will be directed, can be selected from the dispatcher's office, and these stations can be varied at will, from this remote control.

Figure 1:
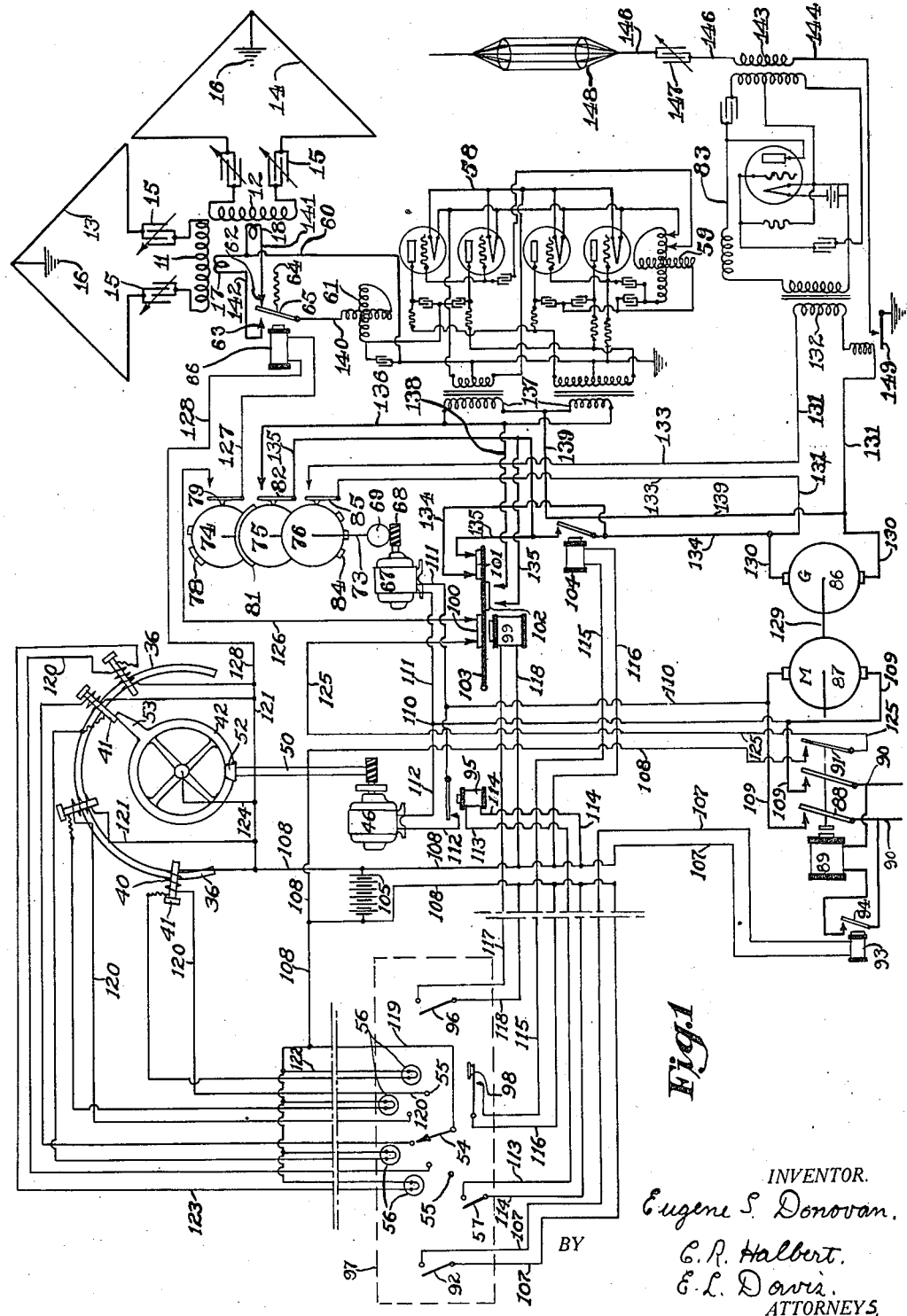
Figure 1 is a diagram of the wiring system used in connection with my impoved radio beacon.

In the diagram in Figure 1, I have illustrated a radio sending set diagrammatically by the reference numeral 58. This set is of the four tube push pull master oscillator and power amplifier type but any set having a substantially constant frequency output which will not change with changes in the position of the coils 17 and 18 may be used. The frequency is controlled by the tuning coil 59 of the sending set. A second tuning coil 61 further insures stable frequencies. This output from this set has one lead 60 connected with one side of each of the sending coils 17 and 18. Referring to the diagrammatic Figure 6 showing this lead 60 would be connected through a brush or other contact with the disc 29 so that rotation of the coils 17 and 18 may be permitted without interrupting the sending circuit. One of the discs or rings 30 is connected to a switch contact 62 and the other is connected to a switch contact 63 opposite the contact 62. A spring 64 normally holds a switch arm 65 in contact with the contact 62 and a solenoid 66 may be energized to pull the switch arm 65 into contact with the contact 63. In other words this construction is such that the switch 65 normally sends the output from the set 58 into the "N" signal primary sending coil 18 and the solenoid 66 may be operated to break this current to the coil 18 and divert it through the "A" signal sending coil 17.

Figure 4:
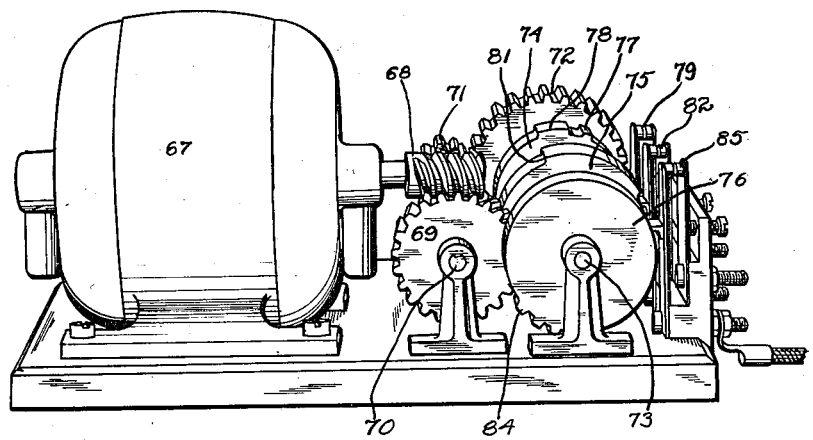
Figure 4 is the perspective view of the mechanism for operating the circuit breakers whereby the "A" and "N" signals are actuated.
Figure 5:
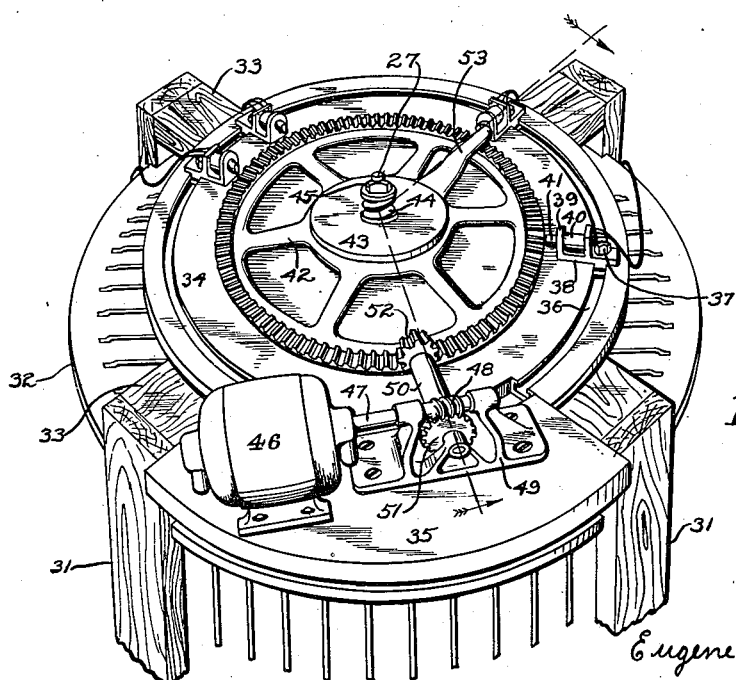
Figure 5 shows a perspective view of my station selector automatic controlling means and the upper part of my direction controlling coils for my improved beacon.

In connection with my improved beacon, I have deemed it advisable to send out the beacon signal for an interval of time and then to alternate that beacon signal with a rest, and to give a properly timed local station position indicating signal in the middle of this rest period. This result is accomplished principally by the mechanism shown in Figure 4 in perspective. This comprises a motor 67 which drives the worm 68 which in turn drives the worm wheel 69. This worm wheel 69 drives a shaft 70 which in turn has a small gear 71 thereon. The small gear 71 drives a large gear 72 which is mounted on the shaft 73. This shaft 73 has cams 74, 75 and 76 secured thereto. The cam 74 has the points 77 and 78 thereon designed to actuate the breaker mechanism 79. This break mechanism 79 is operatably connected with the solenoid 66 to actuate same, whereby rotation of the cam 74 will actuate the breaker 79 and the switch arm 65 to send the "A" signal through the primary coil 18. It will be noted that these points 77 and 78 are the dot and dash respectively on the "A" signal.

In this connection it should be well to point out that the secondary of the sending circuit is broken by the switch arm 65 so that an arc is drawn at the time that the switch arm 65 moves from the contact 62 to the current 63 or reverse, whereby there will be an elision between "A" and "N" signal dots and dashes when the pilot is receiving the "T" signal which will give the pilot the continuous long dash for the "T" signal with substantially no space therein. This arc on the other hand will not interfere materially with the reception of the "A" or "N" signal separately when the pilot is off his course as it merely makes the start and stop of the dots and dashes for the "A" and "N" signals slightly and almost unnoticeably ragged.

The elision caused by this arcing in the "T" signal is illustrated by the lines 80 in Figure 3.

The cam 75 is provided with a relatively long point 81 which is of just the length to give the "T" signal. This point 81 actuates the breaker 82 which in turn is connected to the generator circuit of the sending set 58 so that whenever the breaker 82 is closed by the cam 75 then the beacon sending set will operate.

In this connection it will be noted that this construction of the cams 74 and 75 is very advantageous in that these cams need not be very carefully made. This is because there is but a single cam which controls the total length of the "A" and the "N" signal so that it is not necessary to go to the expense of two complementary cams which would be more expensive to make and a lot of trouble to keep in order. The shoulder for the "N" signal need not be made so carefully as a slight error therein merely lengthens the "T" signal and has an almost imperceptible effect on the length of the dashes in the "A" and/or "N" letters when the pilot is off his course. In this connection it will be noted that the cam point 81 is less than half the total length of the periphery of the cam wheel 75 so that the beacon sending set operates less than half of the time when the beacon is being used and a portion of the balance of the time or interval between the beacon signals may be used for sending out the station locality indicating signal.

A separate sending set 83 is used for sending out this station locality signal. This set should be of relatively low power and the aerial should be designed to send the signal as nearly vertical as possible and the lateral spread of the message should be confined as much as possible. The set here diagrammatically illustrated in Figure 1 is of course merely diagrammatic and any standard sending set of relatively low power can be used in the place thereof. The aerial which I have found most satisfactory is of the vertical wire type as illustrated diagrammatically in Figure 1. This set is preferably operated from the same current source as is used for the beacon sending signals.

The cam wheel 76 is provided with the points 84 thereon which are designed to successively open and close the primary circuit of the sending set 83 to send out the dots therefrom. It will be noted that these points 84 are on the side of the cam wheel 72 opposite the point 81 on the cam wheel 75 so that these station location indicating dots will not be sent at the same time as the station beacon is being sent out. The points 84 operate a breaker 85 which is sent into said primary set of the sending set 83 to cause it to send the three dots.

In this connection it should be pointed out that it is not necessary to use this particular combination of an "A" and "N" for the radio beacon and Morse code "S" for the station location indicator as any other combination may be used which is found desirable. Further, the airport might have a local call letter used to indicate the station indentity which could be sent out on the beacon set at intervals between the sending of the beacon and the station location signal in order that any pilot who might run into the beacon might be quite sure which station it was coming from. Moreover the signal need not be limited to a Morse code signal but might be changed so that a spoken direction or the mechanical reproduction thereof could be used.

The current for the sending set for my improved radio beacon, may be generated by the generator 86 which is driven by the motor 87. This motor is started by the double pole switch 88 which is operated by the solenoid 89. This magnet and the switch 88 are designed to be operated by the 110 volt A C current coming in on the power lines 90. The switch 88 has the third throw 91 positively connected thereto which is designed to close or open the low tension current circuit used in connection with my improved beacon at the same time that the motor generator 86 and 87 are started by the switch 88. This switch 88 and the other throw 91 thereof are preferably located in beacon sending set shelter and are closed or opened by the main control switch 92 which is located on the beacon instrument board in the dispatcher's office at the airport, the switch 92 being connected with the solenoid 93 which in turn is designed to operate a switch 94 to close the power line circuit 90 through the solenoid 89.

The station selector motor switch 57 is connected to operate the station selector motor 46 through a solenoid operated switch 95.

If it is desired to telegraph a message through this radio beacon or to otherwise send some special message to the pilot, this can be accomplished by my improved set by merely closing the message sending switch 96 on the instrument panel 97 in the dispatcher's office and then operating the telegraph key 98 or any other suitable sending instrument.

Closing this message sending switch 96 operates the solenoid 99 which throws a switch arm 103. This switch arm 103 has a contact plate 100 thereon which is included in the circuit through the breaker 79 when the solenoid 99 is operated, thereby making it impossible to send out the "A" signal on the beacon even though the motor 67 may be running. The contact plate 101 at the same time opens the circuit to the breaker 82, making it impossible to close the primary sending circuit of the beacon by means of the said breaker even though the motor 67 be running, whereby this contact plate 101 prevents the "N" signal automatically when it is desired to use the device to send out special signals. Dropping of the switch arm 103 brings the contact plate 102 into position to continuously close the primary sending circuit of the beacon sending set 58 so that the solenoid operated switch 104 may be closed by the telegraph key 98 or other sending instrument to thereby complete the primary circuit through the sending set and operate same to send some individual message through to a pilot flying on this radio beacon.

The low tension current necessary to operate all the solenoid switches (except 89) and the like is furnished from the battery 105. It will be understood that it is also my intention to operate all the controls on the panel 97 through the current from the battery 105, and to use this same current for lighting the lights 56. The motors 46 and 67 are designed to be driven from the power lines 90 and it will be noted that the motor 67 is connected constantly therewith during the operation while the motor 46 may be connected intermittently therewith by means of the switch 57. If desired, the motor 67 may be disconnected from this power line by the operation of the switch arm 103.

Referring to Figure 3 it will be noted that I have diagrammatically illustrated the signal which will be received by the pilot who is on his proper course and traveling along my improved radio beacon. In other words the pilot will first receive the "T" signal, and then when he gets just over the station and within a very short distance thereof only he will receive the "S" or three dot signal indicating his proximity to the station so that he may descend to land at the airport. It will be realized that if it were not for this station location indicator signal, then that the pilot might fly right over the station without noting same when visibility is poor. Moreover in cloudy weather he would be unable to determine by the signals within a matter of four or five miles of the exact location of the airport, whereas with this station location indicator signal, he can determine when he is within a half mile thereof whether it is dark or cloudy or whether there is other impediment to the vision. While he knows that closely the location of the station, he will be able to land even in the dark at an airport where he knows the plan thereof.

Referring then to Figure 1, it will be seen that the beacon is operated by closing the main switch 92 on the control panel 97. This switch 92 is connected by the wires 107 to the solenoid operated switch 93 which operates the switch arm 94. Wires 107 are connected to the battery lead wires 108 so that the solenoid 93 will be operated by the current from the battery 105. Operation of the solenoid 93 closes the switch arm 94 thereby actuating the solenoid 89 which closes the switch arms 88 and 91 thereby cutting in the 110 volt A. C. from the power line to the motor 87 to operate the motor generator set 87—86 to furnish the current for the sending set and also to rotate the station selector motor 67. The switch 88 is connected with the motor 87 by the wires 109, these wires 109 have a shunt circuit 110 taken therefrom and this is divided so that the wires 111 may carry the current to the beacon control motor 67. Wires 112 carry the current from the main power line and wires 110 over to the motor 46, one of the wires 112 being run through the solenoid operated switch 95 so that the circuit through the station selector motor 46 may be broken at will by the solenoid operated switch 95. The station selector motor switch 57 is connected by the wire 113 with one side of the solenoid operated switch 95 and is connected through the battery lead wires 108 by the wire 114 with the other side of the solenoid operated switch 95 so that pressing the switch 57 will operate the motor 46 to rotate the arm 53. The telegraph key 98 has one side thereof connected through the wire 115 with the solenoid operated switch 104 which makes and breaks the primary current of the beacon sending set when the set is being operated to send individual messages. The second lead of the telegraph key 98 is connected by the wire 116 to the other side of the switch 104, this wire 116 being broken to connect it into the battery lead wires 108 to thereby furnish current to operate the solenoid 104.

The message sending control switch 96 has one side thereof connected through the wire 117 to the solenoid operated switch 99. The other side of the solenoid 99 and the switch 96 are connected together to the wire 118 which is broken to be connected into the battery leads 108 to furnish current for this solenoid operated switch 99. The station selector switch 54 has one terminal connected through the wire 119 with one of the battery lead wires 108. Each of the contact points 55 is connected through a wire 120 with one end of one of the solenoids 40 of the station selector device. It will be understood, however, that one point 55 is blank so as to give an off position for the switch 54. The other ends of each of the solenoids 40 are connected through the wires 121 to the other battery lead 108.

One of the battery leads 108 has the plurality of leads 122 connected thereto each of which extends to one of the station indicating lights 56. The other terminals of these lamps are connected by a plurality of wires 123 so that each lamp is connected by one wire 123 with one of the plungers 41 which are insulated from their supports. The arm 53 of the station selector is grounded through a wire 124 with the wire 121 and the other battery lead wire 108.

One of the lead wires of the battery 108 is extended down to the switch point for the switch 91 which is operated as will be remembered by the main control switch 92. The arm itself is connected through the wire 125 with the contact plate 100 on the switch arm 103. The second contact which the contact plate 100 closes is connected through a wire 126 with the breaker mechanism 79. It will thus be seen when the main power switch 92 is closed, then that battery current will be supplied through the breaker 79 to the contact plate 100. This current may however, be shut off by operating the message sending switch 96 which throws the switch control 103 thereby breaking the contact through the contact plate 100. The other end of the breaker 79 is connected through the wire 127 with one end of the solenoid 66 which operates the switch throwing the beacon from the "A" to the "N" signal. The other end of this solenoid 66 is connected to the wire 128 with the return wire 121 which, as has been described, is connected to the other battery lead wire 108. Battery current for the solenoid 66 is thus supplied to the lead wires 108 the wire 125, the wire 126, the wire 127, and the wire 128.

The reference 129 merely indicates diagrammatically the driving connection between the motor 87 and the generator 86 of the motor generator set. The generator is provided with lead wires 130. These are connected through the wires 131 with the primary coil 132 of the station locality sending set 83. A pair of wires 133 each have their ends connected into one of the wires 131 and their opposite ends connected with the breaker 85. It will thus be seen that the breaker 85 may operate through the cam point 84 and the wires 133 to make and break the primary circuit wires 131 of the station locality sending set. One lead wire 130 of the generator 86 is connected through a wire 134 to one end of the switch of the solenoid operated switch 104. This wire 134 is also connected to one of the contacts for the contact plate 101. The other contact for the contact plate 101 and the contact for the switch arm for the solenoid operated switch 104 are connected together through the wire 135. This wire 135 is also connected to one terminal of the breaker 82.

The second terminal of the breaker 82 is connected by the wire 136 with the primary coils 137 of the beacon sending set. This primary circuit is also connected through the wire 138 with one of the contacts opposite the contact plate 102. The other side of the coils 137 are connected through a wire 139 with the other primary lead wire 130 of the generator 86.

From the foregoing it will be seen that one terminal of the generator 86 is connected through one of the wires 130 and the wire 139 with the one side of the primary coils 137, of the beacon sending set. The other side of the coils 137 may be connected back to the other generator lead wire 130 through the wire 136, breaker 82, wire 135, contact plate 101, and wire 134, or through the wire 138, contact plate 102, wire 135, switch 104, and wire 134, with the other generator lead 130.

One side of the secondary coil of the beacon sending set 58 is connected through the wire 60 with the common input wire of the primary sending coils 17 and 18. The other side of this secondary coil 59 and sending set 58 is connected through a wire 140 with the switch arm 65 of the solenoid operated switch 66 which makes contact with the contacts 62 and 63. These contacts 62 and 63 are connected respectively through the wires 141 and 142 with the "N" and "A" coils 18 and 17 of the beacon signal.

The secondary coil 143 of the station locality indicator sending set 83 is connected through a wire 144 with a ground 145. The other end of this coil 143 is connected through a wire 146 with an aerial 148. A variable condenser 147 is cut into this wire 146 to control the frequency of the signal sent. The aerial 148 is of what is termed "the vertical straight wire type" and in the form of device which I have found successful, is formed from a plurality of parallel vertical wires arranged with a spreader at either end thereof. As has heretofore been mentioned the idea of this aerial is to give the relatively powerful signal in vertical direction so that the pilot passing over the station will be sure to get the signal, but the signal should be limited to a locality directly over the station as much as possible so that the pilot can locate himself above the station as accurately as possible.

The ground wire 144 has an automatic breaker switch 149 connected therein so that the ground wire circuit for the aerial 148 may be broken. This circuit breaker 149 has its coil connected in the primary circuit for the sending set 83 in any suitable manner as by being cut into one of the wires 131. The switch 149 is so arranged that the ground wire 144 will be normally an open circuit but will be closed whenever the primary circuit of the sending set 83 is energized. This construction has the advantage of preventing the aerial 148 from picking up the beacon signal and rebroadcasting it in a non-directional signal which it would do if the ground wire circuit 144 remains closed during the sending of the beacon signal. This is one of the important advantages of my improved beacon signal in that the aerial for the station locality indicator does not thereby affect the directional effect of the beacon signal.

The various advantages of this improved device have been brought out in the course of the specification, but it may be well to again mention that this beacon serves the double purpose of a direction indicator and an airport location indicator and it also enables the airport to send messages to individual pilots in cases where such may be desirable. It has a further advantage of being so constructed that the actual sending set may be located at one corner or some other out-of-the-way place in the airport while the controls therefore may be located entirely in the office of the plane dispatcher for the airport. A still further advantage results from the character of the signal used wherein the "A" and the "N" signals very clearly indicate to the pilot when he is off his course and the "T" signal is a clear indication to the pilot that he is on his course.

Still a further advantage results from the fact that the "N" signal is given by closing the primary circuit of the beacon sending set and then the "A" signal is given by switching the secondary current of the sending set from one coil to another in that this procedure draws an arc between the "N" and "A" signals which makes the "T" signal substantially continuous. This arc does not, however, noticeably effect the reception of the "A" and "N" signals when the latter are being received alone. Still a further advantage results from this construction in that it makes it possible to make the cam operating mechanism without a great deal of expense as the limits need be held very closely in order to make the signal work perfectly.

Still a further advantage results from the provision of means for sending individual messages to the pilot while he is receiving the beacon signal so that he may be warned of storms or special stops or other conditions which may be necessary during his flight through the air. In this connection an advantage results from the fact that the set is so constructed that the station locality indicator will continue to operate while the set is being used for a special message so that the pilot will not fly over the airport in the dark or in low visibility weather while he may be receiving some special message from the airport station.

Further, the station locality indicating sets may be disposed at regular intervals along any given course, if desired, to indicate speed and position and these stations may be synchronized with, and controlled by the sending stations if desired.

Some changes may be made in the arrangement, construction and combination of the various parts of my improved device, without departing from the spirit of my invention, and it is my intention to cover by my claims, such changes as may reasonably be included within the scope thereof.

I claim as my invention:

1. In a device of the character described, a sending set having a primary and secondary circuit therein, a pair of primary sending coils, means for making and breaking the primary circuit of the set, and means for switching the secondary current of the set from one primary coil to the other whereby there may be an elision between signals when the secondary current is switched from one coil to the other.

2. In a radio beacon, a sending set having a primary and secondary circuit therein, a pair of primary sending coils, means for automatically making and breaking the primary circuit of the set, and means for automatically switching the secondary current of the set from one primary coil to the other primary coil during the interval in which the primary circuit is complete.

3. In a radio beacon, a sending set having a primary and secondary circuit therein, a pair of primary sending coils, and means driven in unison for making and breaking the primary circuit and for switching the secondary current of the set from one primary coil to the other primary coil during the interval in which the primary circuit is complete.

4. In a radio beacon, a radio goniometer having a pair of angularly spaced primary coils therein, a radio transmitter, and means for conducting the output current from said transmitter to said coils, means to substantially instantaneously change said current from one coil to the other to alternately transmit from each coil the individual dots and dashes of a pair of interlocking signals.

5. In a radio beacon, a transmitter, a pair of directional sending loops, and means for switching the output current of said transmitter from one loop to the other substantially instantaneously to thereby transmit a pair of interlocking signals from said loops.

6. In a radio beacon, a transmitter, a radio goniometer having a pair of primary coils therein, a double throw switch arranged to selectively complete the circuits between said coils and the output of said transmitter, means for urging said switch to one of its positions to thereby energize one of said coils, and means for returning said switch to the other position when said urging means is inoperative.

7. In a radio beacon, a transmitter, a radio goniometer having a pair of primary coils therein, a double throw switch arranged to selectively complete the circuits between said coils and the output of said transmitter, a relay disposed to selectively move said switch to one of its positions, a spring arranged to move said switch to its other position when said relay is inoperative, and a second switch for energizing said relay, the output current from said transmitter energizing one coil when the relay is operated and the other coil when said relay is inoperative.

8. In a radio beacon, a transmitter, a radio goniometer having a pair of primary coils therein, a double throw switch arranged to selectively complete the circuits between said coils and the output of said transmitter, means for urging said switch to one of its positions, a relay arranged to move said switch to its other position, and common controlling means for said relay and transmitter whereby the transmitter will intermittently operate to send dash signals while the relay will operate to alternately conduct portions of these dash signals to first one of said coils and then the other to thereby transmit interlocking signals.

9. In a radio beacon, a transmitter, means for directing signals along two paths at an angle to each other having an overlapping zone, means for sending a continuous signal in said zone for a predetermined length of time and means for directing said continuous signal along one path for a portion of said time and along the other path for the remainder of said time.

10. In a radio beacon, a transmitter, means for directing signals along two paths at an angle to each other having an overlapping zone, means for sending a continuous signal in said zone for a predetermined length of time and means for changing from one signal path to the other while sending said continuous signal.

11. In a radio beacon, a transmitter, an antenna having means for directing a signal along either of two paths at an angle to each other, said paths having an overlapping zone, means for energizing asid antenna to send a signal of substantially constant intensity in said zone and means to alternately change said signal from one signal path to the other to produce an interlocking signal.

EUGENE S. DONOVAN.